Dec. 22, 1931.  G. WALTHER  1,837,694
METAL WHEEL
Filed Dec. 20, 1926   3 Sheets-Sheet 1

INVENTOR,
George Walther,
BY Howard S. Smith
  His ATTORNEY.

Dec. 22, 1931.  G. WALTHER  1,837,694
METAL WHEEL
Filed Dec. 20, 1926   3 Sheets-Sheet 2

INVENTOR,
George Walther,
BY Howard S. Smith,
His ATTORNEY.

Dec. 22, 1931.  G. WALTHER  1,837,694
METAL WHEEL
Filed Dec. 20, 1926   3 Sheets-Sheet 3

INVENTOR,
George Walther.
BY Howard S. Smith,
His ATTORNEY.

Patented Dec. 22, 1931

1,837,694

UNITED STATES PATENT OFFICE

GEORGE WALTHER, OF NEAR DAYTON, OHIO, ASSIGNOR TO THE DAYTON STEEL FOUNDRY COMPANY, A CORPORATION OF OHIO

METAL WHEEL

Application filed December 20, 1926. Serial No. 155,997.

This invention relates to new and useful improvements in metal wheels.

It is the principal object of my invention to provide a light and economically-constructed metal wheel that comprises a spider over whose spoke ends a tire rim is hung to rest flat thereon.

It is another object of my invention to provide certain contiguous parts of the tire rim with lugs on both sides to straddle the spoke ends of the spider over which it is first hung, after which the rim may be easily driven home to bring those lugs that are on the front side only against the remaining spoke ends of the spider. There is a tension contact between the rim and the spoke ends to equalize or true it up so that it cannot be out of round when it has been driven home upon them.

It is another object of my invention to provide pivotal means on the spokes of the spider for engagement between flanged lugs on the rear side of the rim and the spokes to firmly lock it on the latter after it has been driven home. Between these locking means and the lining up stops or lugs on the front side of the rim it will be solidly held on the spoke ends of the spider under the most rough conditions of travel.

It is still another object of my invention to provide the rim with a channel to enable it to be easily gotten on and off the spider.

Other important and incidental objects will be brought out in the following specification and particularly set forth in the subjoined claims.

Figure 1:
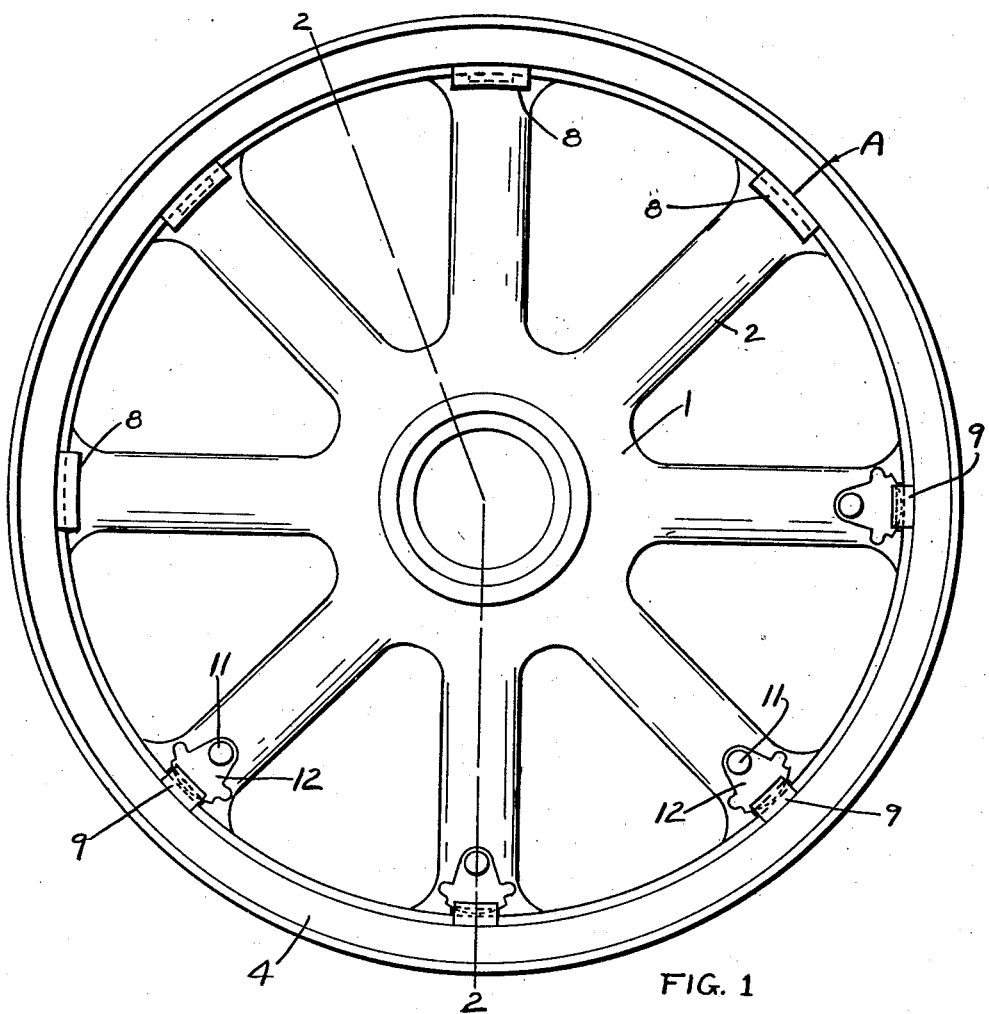
Figure 7:
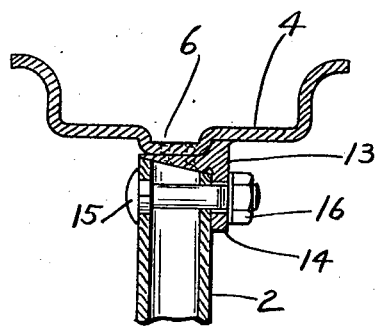
Figure 2:
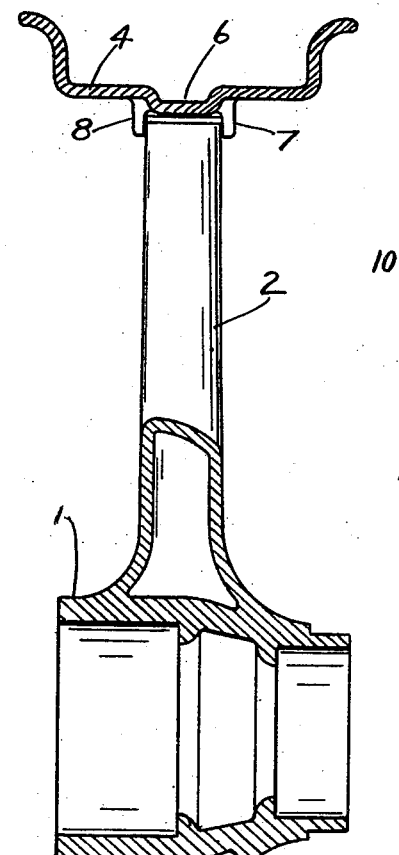
Figure 3:
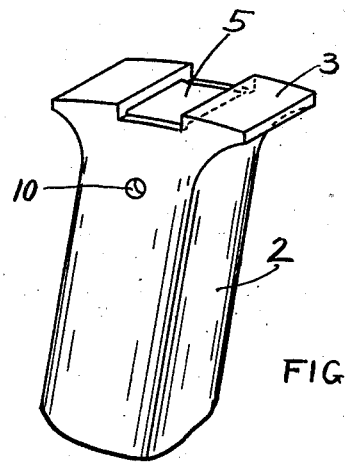
Figure 4:
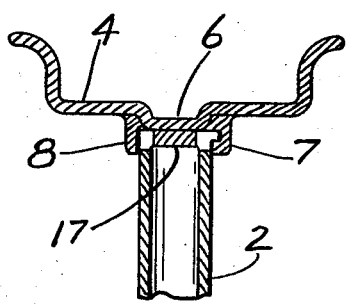
Figure 5:
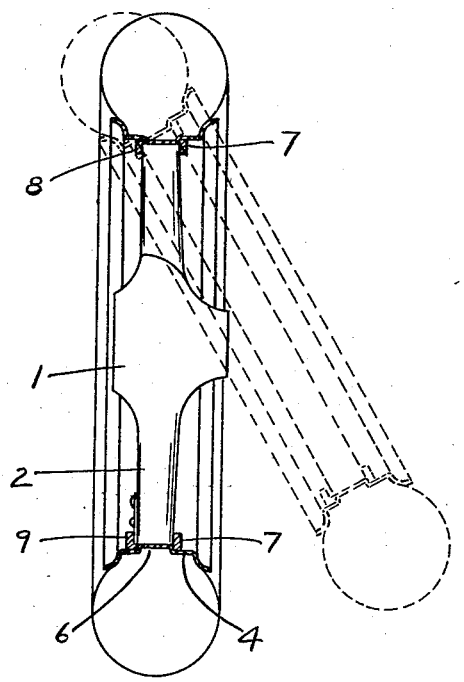
Figure 6:
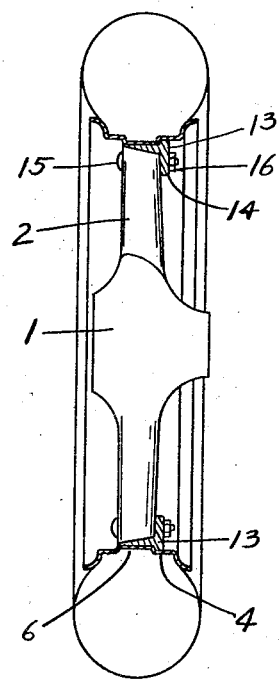

In the accompanying drawings illustrating my invention, Figure 1 is a rear elevational view of my improved metal wheel. Figure 2 is a sectional view taken through the same on the line 2—2 of Figure 1. Figure 3 is a perspective view of one of the spoke ends of the spider. Figure 4 is a sectional view taken through one of the spoke ends and the rim, showing one of the alining lugs on the latter grooved to receive a tongue on the spoke end. Figure 5 is a cross sectional view taken through my improved wheel, showing in dotted lines how the tire rim is hung over the spoke ends of the spider before said rim is driven home upon it. Figure 6 is a cross sectional view taken through a metal wheel of this type, showing modified means for securing the rim upon the spider. And Figure 7 is an enlarged, longitudinal, sectional view taken through said means, the tire rim and a spoke end of the spider.

Referring to the accompanying drawings for a detailed description of my invention, the numeral 1 designates the hub and 2 the spokes of a wheel spider that is cast from steel or other suitable material. Such a casting can easily be made in a foundry, thus reducing the cost of producing the wheel.

Each spoke 2 of the spider is enlarged at its outer end as shown in Figure 3 to provide a flat seat 3 for a tire rim 4 which is split over one spoke as shown at A in Figure 1. Transversely formed in each spoke end as shown in Figure 3, is a groove 5 through which the lugs and driver to be hereinafter described may freely pass when the tire rim is being mounted upon the spider.

The tire rim 4 is preferably formed with a continuous channel 6 at the front side of which there is secured to said rim a series of alining lugs or stops 7. These lugs 7 are placed in such positions on the rim 4 that they will engage the spoke ends of the spider when the tire rim is driven home thereon.

Opposite two or more alining lugs 7 there are secured to the rear side of the tire rim 4, alining lugs 8 which, together with the lugs 7, straddle their respective spoke ends of the spider when the tire rim is hung over the latter as shown in dotted lines in Figure 5. After the rim has been driven home on the spider, it will rest flat upon the spoke ends and will be held against lateral displacement thereon by the following means.

Referring to Figures 1 and 2, there is secured on the rear side of the tire rim 4 opposite the alining lugs 7 on the front side, flanged lugs 9 which are adapted to pass through the grooves 5 in spoke ends when the time rim is driven home on them. Formed in each spoke 2 of the spider near the groove 5 therein, is a transverse hole 10 which receives a rivet 11. By means of these rivets locking ears 12 are pivotally secured to the spoke ends. After the tire rim 4 has been driven home on the spider, these ears 12 are turned to bring their outer portions between the spoke ends and the flanges on the lugs 9 to firmly hold the rim against lateral displacement on the spider when the wheel is subjected to heavy shocks. The alining lugs 7 and 8 act as guides to bring the tire rim straight, while the locking lugs 9 and pivotal ears 12 serve to hold it straight or true under all conditions of service.

In Figures 6 and 7 I have illustrated another form of means for securing the tire rim 4 to the spoke ends of the spider. In this instance a beveled lug 13 having a flange part 14 is riveted to the tire rim 4 for engagement with a respective spoke end, which is also beveled. (See Figure 7.) Formed in each flange end 14 of the beveled lugs 13 is a hole which is adapted to register with similar holes in the spoke end to receive a bolt 15 on whose threaded end a nut 16 is applied to bring the face of the lug tight against the end of the spoke.

In Figure 2 I have shown as a driver, a lug 17 which is riveted to the channel portion of the tire rim 4 for entrance into the hollow end of the spoke.

Having described my invention, I claim:

1. A metal wheel comprising a spider made up of a hub and spokes, a tire rim provided with alining lugs, a part of which are on both sides of the rim to straddle the spoke ends and others of which are on one side of the rim only to engage said spoke ends when the rim is driven home upon them, flanged lugs on the tire rim opposite the lugs which are on one side only of said rim, and locking means adapted to be inserted between the flanged lugs and the spoke ends when the tire rim has been driven home on the latter.

2. A metal wheel comprising a spider made up of a hub and spokes, a tire rim provided with alining lugs, a part of which are on both sides of the rim to straddle the spoke ends and others of which are on one side of the rim only to engage said spoke ends when the rim is driven home upon them, flanged lugs on the tire rim opposite the lugs which are on one side only of said rim, and locking ears pivoted to the spokes for engagement between the latter and the flanged lugs when the tire rim has been driven home on the spider.

In testimony whereof I have hereunto set my hand this 18 day of December, 1926.

GEORGE WALTHER.